(12) United States Patent
Coulter et al.

(10) Patent No.: US 10,831,416 B2
(45) Date of Patent: Nov. 10, 2020

(54) PAGE COMPLEXITY ANALYSIS FOR PRINT JOBS

(71) Applicants: Justin J. Coulter, Longmont, CO (US); David Ward, Broomfield, CO (US)

(72) Inventors: Justin J. Coulter, Longmont, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/292,592

(22) Filed: Mar. 5, 2019

(65) Prior Publication Data
US 2020/0285430 A1 Sep. 10, 2020

(51) Int. Cl.
*G06F 3/12* (2006.01)
*G06K 15/02* (2006.01)

(52) U.S. Cl.
CPC ............ *G06F 3/1208* (2013.01); *G06F 3/126* (2013.01); *G06F 3/1248* (2013.01); *G06F 3/1259* (2013.01); *G06K 15/1836* (2013.01)

(58) Field of Classification Search
CPC .................................................... G06F 3/1208
USPC ........................................................ 358/1.15
See application file for complete search history.

(56) References Cited

U.S. PATENT DOCUMENTS

| | | | |
|---|---|---|---|
| 6,327,050 B1 * | 12/2001 | Motamed | G06K 15/1857 358/1.15 |
| 6,347,852 B1 | 2/2002 | Chen | |
| 8,045,188 B2 | 10/2011 | McCarthy et al. | |
| 8,130,429 B2 | 3/2012 | Ferlitsch | |
| 8,223,353 B2 | 7/2012 | Caruso et al. | |
| 9,600,213 B1 | 3/2017 | Rajalingam et al. | |
| 2002/0163664 A1 | 11/2002 | Sugano | |
| 2004/0085558 A1 | 5/2004 | Minns et al. | |
| 2006/0285146 A1 | 12/2006 | Yang | |
| 2009/0161163 A1 * | 6/2009 | Klassen | G06F 3/1213 358/1.18 |

(Continued)

FOREIGN PATENT DOCUMENTS

| | | |
|---|---|---|
| EP | 2713263 A2 | 4/2019 |
| JP | 2009037539 A | 2/2009 |

OTHER PUBLICATIONS

IBM et al.; ip.com; A system for Performance Benchmarking of complex Print Jobs; Aug. 4, 2003.

(Continued)

*Primary Examiner* — Jacky X Zheng
(74) *Attorney, Agent, or Firm* — Duft & Bornsen, PC

(57) ABSTRACT

A subset of pages in a job are analyzed for page complexity to determine if a repeating complexity pattern is present in the job. If a repeating complexity pattern is found, then the page complexities can be extrapolated to other pages in the job. One embodiment comprises a plurality of Raster Image Processors (RIPs) and a scheduler. The scheduler receives a print job, identifies a subset of logical pages in the print job for complexity analysis, and calculates a page complexity value for logical pages in the subset. The scheduler determines that a repeating pattern of page complexity values is present in the subset, and assigns page complexity values to remaining logical pages in the print job by extrapolating the repeating pattern of page complexity values to the remaining logical pages. The scheduler assigns the logical pages in the print job to the RIPs based on their page complexity value.

18 Claims, 10 Drawing Sheets

(56) References Cited

U.S. PATENT DOCUMENTS

| | | | |
|---|---|---|---|
| 2012/0307276 A1* | 12/2012 | Takenaka | G06K 15/1823 |
| | | | 358/1.13 |
| 2013/0063766 A1 | 3/2013 | Lax et al. | |
| 2016/0202938 A1 | 7/2016 | Bandyopadhyay et al. | |
| 2018/0107436 A1 | 4/2018 | Groot et al. | |
| 2018/0107905 A1 | 4/2018 | Davies et al. | |

OTHER PUBLICATIONS

European Search Report; Application EP20160414; dated Aug. 4, 2020.

\* cited by examiner

PAGE COMPLEXITY ANALYSIS FOR PRINT JOBS

FIELD

This disclosure relates to the field of printing systems, and in particular, to print controllers that interpret and rasterize incoming print jobs.

BACKGROUND

In the field of printing, it is generally desirable to maximize not just printing quality, but also printing speed at a printer. Customers tend to dislike any delay that occurs between sending a print job to a printer, and receiving the printed sheets of the print job. Therefore, printer manufacturers strive to optimize not only the physical printing speed of marking engines that mark printed sheets, but also the processing speed of devices that prepare incoming print jobs for printing by interpreting and rasterizing them.

In order to increase the processing speed for incoming print data, print controllers often include multiple Raster Image Processors (RIPs) that operate in parallel. The print controller splits the incoming print job into groups of logical pages, and sends the groups of logical pages to different parallel RIPs for interpretation and rasterization.

However, some portions of a print job may entail more processing than others, which can cause the RIPs processing those portions to become overloaded and possibly, prevent those portions of the print job from being ready when they are needed during the printing process. Thus, there is a need to improve upon the process that schedules pages to RIPs.

SUMMARY

In the embodiments described herein, a subset of pages in a job are analyzed for page complexity to determine if a repeating complexity pattern is present in the job. If a repeating complexity pattern is found, then the page complexities calculated during the complexity analysis can be applied to other pages in the job, which may aid in scheduling the pages in the job. As only a portion of the pages in the job are analyzed for complexity, with the results extrapolated to other pages in the job, the complexity analysis is performed much more quickly than analyzing the entire job.

One embodiment comprises a print controller that includes a plurality of RIPs and a scheduler. The scheduler receives a print job, identifies a subset of logical pages in the print job for complexity analysis, and calculates a page complexity value for logical pages in the subset of logical pages. The scheduler determines that a repeating pattern of page complexity values is present in the subset of logical pages, and assigns page complexity values to remaining logical pages in the print job by extrapolating the repeating pattern of page complexity values to the remaining logical pages. The scheduler assigns the logical pages in the print job to the plurality of RIPs based on their page complexity value.

Another embodiment comprises a method of performing a complexity analysis for print jobs. The method comprises receiving a print job, identifying a subset of logical pages in the print job for complexity analysis, and calculating a page complexity value for logical pages in the subset of logical pages. The method further comprises determining that a repeating pattern of page complexity values is present in the subset of logical pages, assigning page complexity values to remaining logical pages in the print job by extrapolating the repeating pattern of page complexity values to the remaining logical pages, and assigning the logical pages in the print job to a plurality of Raster Image Processors (RIPS) based on their page complexity value.

Another embodiment comprises a non-transitory computer readable medium comprising programmed instructions which, when executed by one or more processors, directs the one or more processors to receive a print job, identify a subset of logical pages in the print job for complexity analysis, and calculate a page complexity value for logical pages in the subset of logical pages. The programmed instructions further direct the one or more processors to determine that a repeating pattern of page complexity values is present in the subset of logical pages, assign page complexity values to remaining logical pages in the print job by extrapolating the repeating pattern of page complexity values to the remaining logical pages, and assign the logical pages in the print job to a plurality of Raster Image Processors (RIPS) based on their page complexity value.

The above summary provides a basic understanding of some aspects of the specification. This summary is not an extensive overview of the specification. It is intended to neither identify key or critical elements of the specification nor delineate the scope of the embodiments of the specification, or delineate the scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
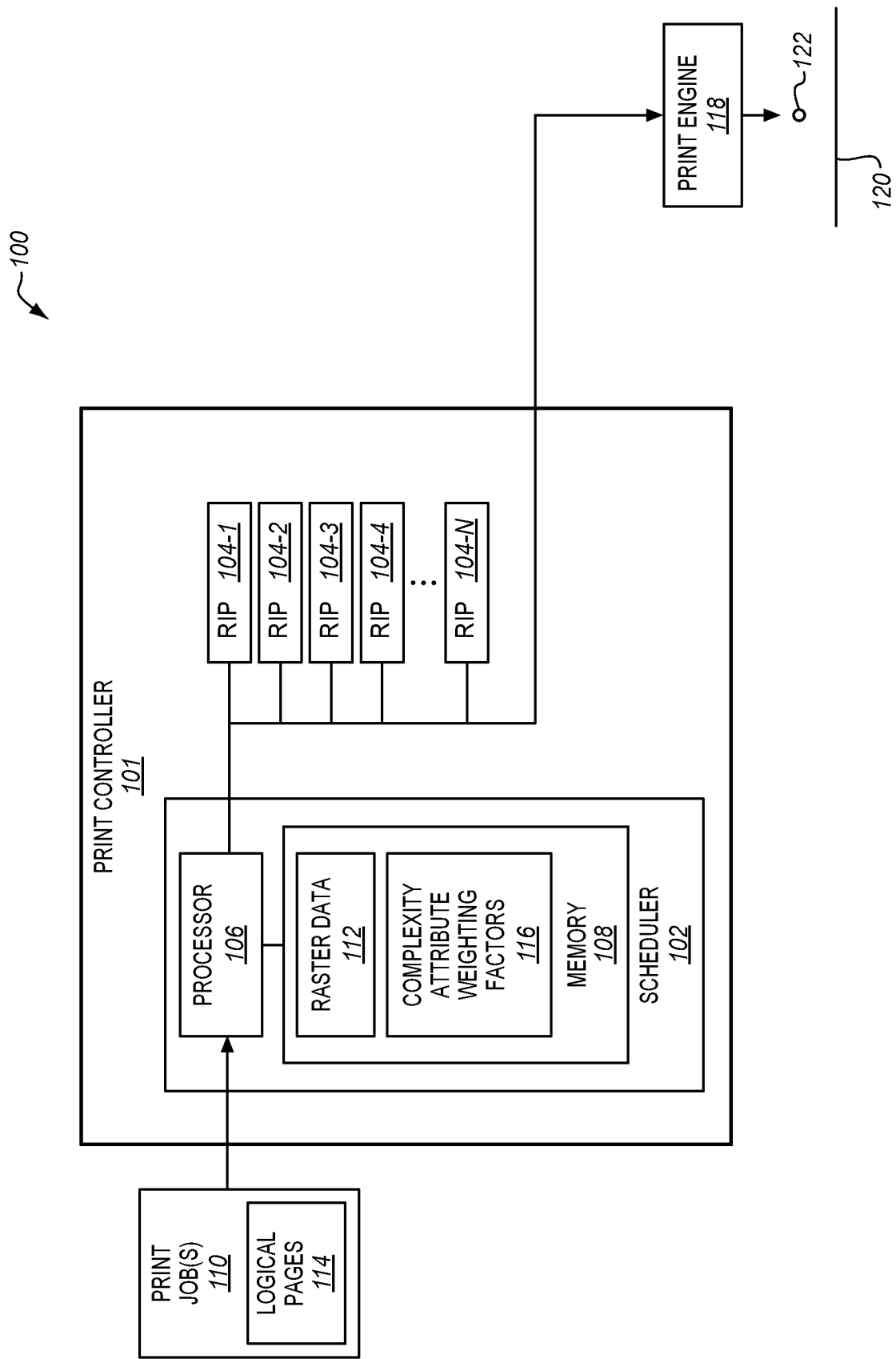
FIG. 1 is a block diagram of a system an illustrative embodiment.

FIG. 1 is block diagram of a system 100 in an illustrative embodiment. In this embodiment, system 100 includes a print controller 101. In some embodiments, system 100 may further include a print engine 118. Print controller 101 may operate outside of a printing system as a separate element in some embodiments, or may be included within a printing system in other embodiments. Further, print controller 101 may be included within print engine 118 in some embodiments.

In this embodiment, print controller 101 includes a scheduler 102 and a plurality of RIPs 104. In this embodiment, scheduler 102 includes a processor 106 and a memory 108. RIPs 104 may be implemented in hardware, firmware, or a combination of hardware and firmware. RIPs 104 comprise any component, system, or device that rasterizes logical pages 114 to generate raster data 112, which may be stored at memory 108 of scheduler 102 or at a RIP spool (not shown). During the printing process, print controller 101 may transmit raster data 112 to a destination (e.g., print engine 118). Print engine 118 may receive raster data 112 from print controller 101, and generate a printed output based on raster data 112.

While the specific hardware implementation of print controller 101 is subject to design choices, print controller 101 may comprise any electronic circuits and/or optical circuits that are able to perform the functions described herein for print controller 101. Print controller 101 may include one or more processors (e.g., processor 106 of scheduler 102), Central Processing Units (CPU), Graphics Processing Units (GPU), microprocessors, Digital Signal Processors (DSPs), Application-specific Integrated Circuits (ASICs), Programmable Logic Devices, control circuitry, etc. Some examples of processors include INTEL® CORE™ processors, Advanced Reduced Instruction Set Computing (RISC) Machines (ARM®) processors, etc.

Print controller 101 may further comprise any electronic circuits, and/or optical circuits, and/or magnetic circuits that are able to store data. For instance, print controller 101 may include one or more memories (e.g., memory 108 of scheduler 102), volatile or non-volatile Dynamic Random-Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Print engine 118 comprises any system, component, or device that marks a medium 120 with one or more colorant(s) 122. Colorant 122 may comprise toner, liquid inks, wax, or any material suitable to mark medium 120. Medium 120 may be continuous form or cut sheet, as desired. Medium 120 may comprise paper, textile, plastic, or any tangible substrate for marking with colorant 122. Print engine 118 may comprise one or more marking engines as a matter of design. For example, print engine 118 may comprise at least one marking engine disposed on each side of medium 120.

In this embodiment, memory 108 stores a plurality of complexity attribute weighting factors 116, which may be used by scheduler 102 to assign logical pages 114 in print jobs 110 to RIPs 104.

Figure 2:
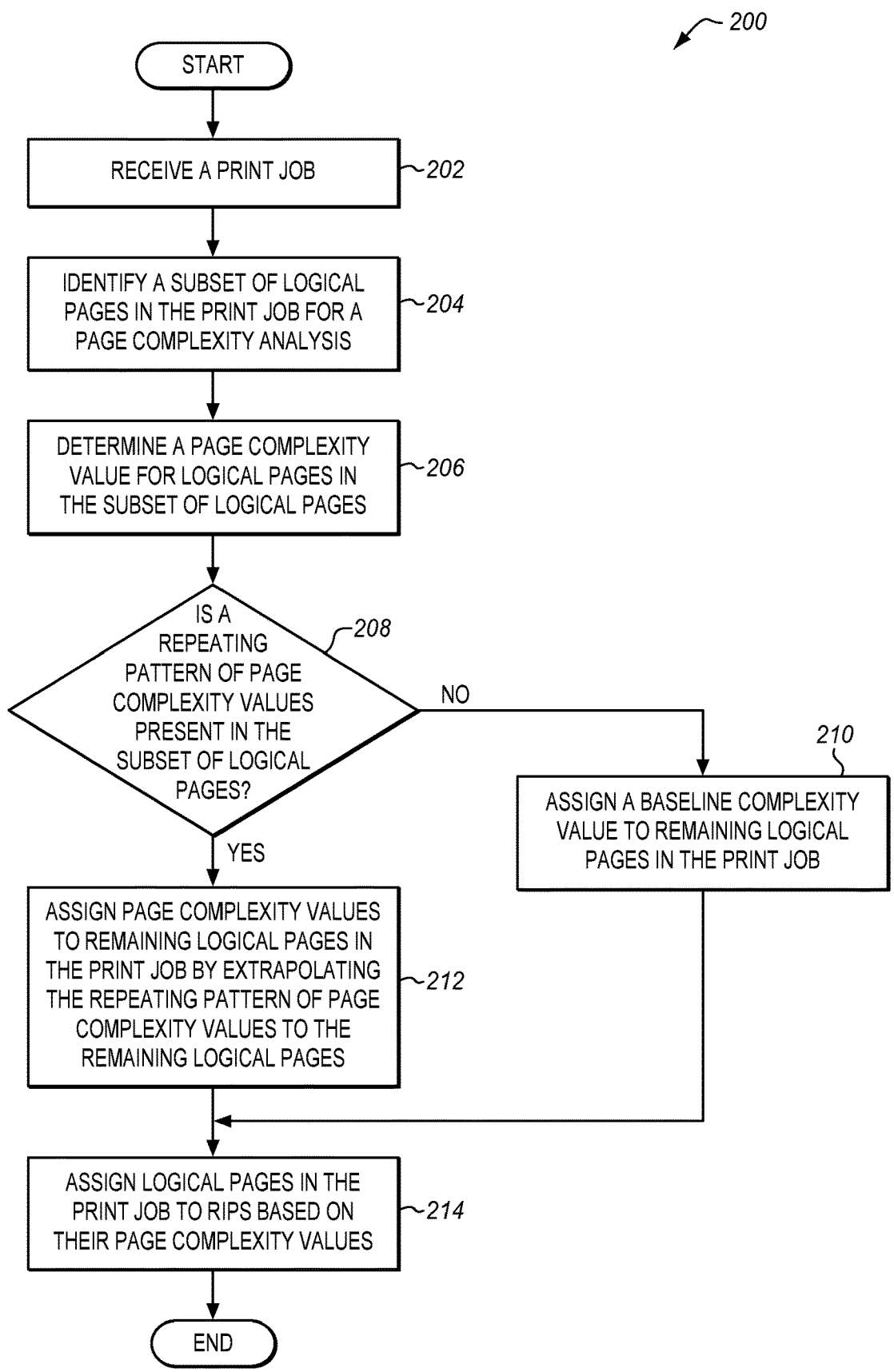
FIG. 2 is flow chart of a method of performing a complexity analysis for print jobs in an illustrative embodiment.

Consider that print controller 101 is operational and ready to begin processing print jobs 110. FIG. 2 is a flow chart of a method 200 of performing a complexity analysis for print jobs 110 in an illustrative embodiment. FIGS. 3-7 illustrates additional details of method 200 in illustrative embodiments.

Method 200 will be discussed with respect to print controller 101 of FIG. 1, although method 200 may be performed by other systems, not shown. The steps of the flow charts described herein may include other steps that are not shown. Also, the steps of the flow charts described herein may be performed in an alternate order.

Processor 106 of scheduler 102 receives print job 110 (see FIG. 2, step 202). Print job 110 may utilize a Page Description Language (PDL) to describe print data in print job 110. In one embodiment, print job 110 may comprise a Variable Data Print (VDP) job, which uses records to organize logical pages 114. Some examples of a PDL include the Portable Document Format (PDF), an Intelligent Printer Data Stream (IPDS), POSTSCRIPT®, etc. Print job 110 may include a job ticket (not shown) in some embodiments, which provides a mechanism for specifying instructions for processing of print job 110. The job ticket may be received separately from print job 110 in some embodiments.

Returning to FIG. 2, processor 106 identifies a subset of logical pages 114 in print job 110 for a page complexity analysis (see FIG. 2, step 204). In some embodiments, the subset of logical pages 114 that are identified correspond to a structural organization of logical pages 114 in print job 110. For example, if print job 110 comprises a VDP job, then the subset of logical pages 114 identified for a complexity analysis may comprise a record of the VDP job.

Figure 8:
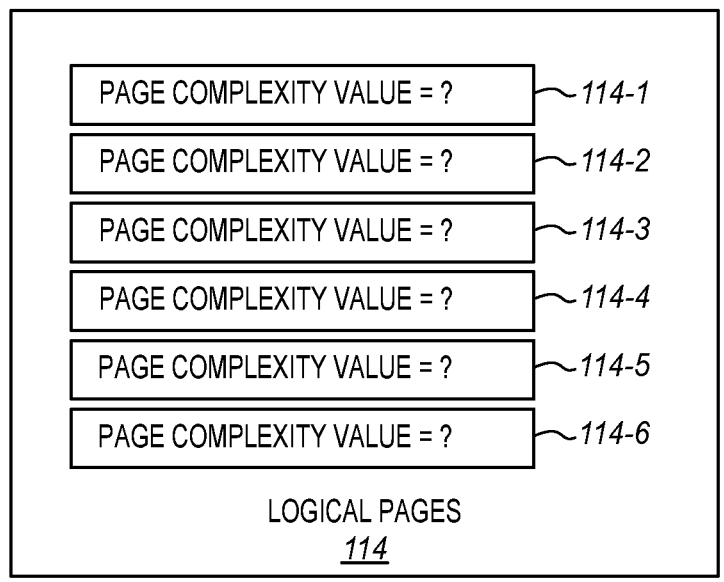
FIG. 8 illustrates a subset of logical pages identified for complexity analysis in an illustrative embodiment.

FIG. 8 illustrates a subset of logical pages 114 identified for a page complexity analysis in an illustrative embodiment. Although the subset of logical pages 114 in this embodiment includes six pages, the pages identified for a page complexity analysis may comprise more or less pages as desired. Therefore, the particular number of pages illustrated in FIG. 8 is merely for the purposes of discussion with respect to method 200. Further, the pages identified for analysis may comprise any subset of logical pages 114 of print job 110 as desired without regard to an order or location of the pages within print job 110. Further, the pages identified for analysis may be consecutive or non-consecutive as desired. In this embodiment, the page complexity value for logical pages 114 illustrated in FIG. 8 are unknown, as indicated by "?".

Processor 106 determines a page complexity value for the subset of logical pages 114 (see FIG. 2, step 206). Determining a page complexity value for the subset of logical pages 114 may be performed using any combination of complexity attribute weighting factors 116 as desired. Generally, a page complexity value for a page is a variable weighting value that represents how the complexity of the pages compare to each other. For example, if one logical page is calculated to have a page complexity value of "1", and another logical page is calculated to have a page complexity value of "2.5", then the difference between the two pages represents a difference in the calculated page complexity. Differences in page complexity may translate into differences in computational efforts when interpreting and/or rasterizing a page. For example, interpreting and/or rasterizing a page assigned a page complexity value of "2.5" may entail more computational effort, time, and/or system resources than interpreting and/or rasterizing a page assigned a page complexity value of "1".

Generally, complexity attribute weighting factors 116 comprise a plurality of different values that define differences in how page or job attributes effect the computational effort, system resources, and/or time used to interpret and/or rasterize a page. For instance, some complexity attributes may have little or no effect on the computational effort, system resources, and/or time used to interpret and/or rasterize a page. Such complexity attributes may be weighted less than other complexity attributes that have a more significant effect on the computational effort, system resources, and/or time used to interpret and/or rasterize a page. In the embodiments described herein, positive weighting adjustments to the page complexity value may be used to indicate a higher page complexity calculated for a page with respect to the baseline complexity value. However, other embodiments may utilize other types of weighting adjustments as desired.

Processor 106 determines whether a repeating pattern of page complexity values are present in the subset of logical pages 114 identified for a page complexity analysis (see FIG. 2, step 208). If no repeating pattern was detected by processor 106 in the subset of logical pages 114, then processor 106 may assign a baseline complexity value (e.g., a non-zero value) to logical pages 114 that remain in print job 110 (see FIG. 2, step 210). As described herein, logical pages 114 that remain in print job 110 may comprise logical pages 114 that do not have page complexity values assigned. In one embodiment, processor 106 may assign a page complexity value of "1" (e.g., a baseline complexity value) to the page complexity values of the remaining pages. In other embodiments, processing of method 200 may return to step 204, where a larger subset of logical pages 114 is identified for analysis, and the page complexity analysis may be repeated. In response to assigning the baseline complexity value to the remaining logical pages 114 in print job 110, processor 106 assigns logical pages 114 in print job 110 to RIPs 104 based on their page complexity values (see FIG. 2, step 214).

Figure 9:
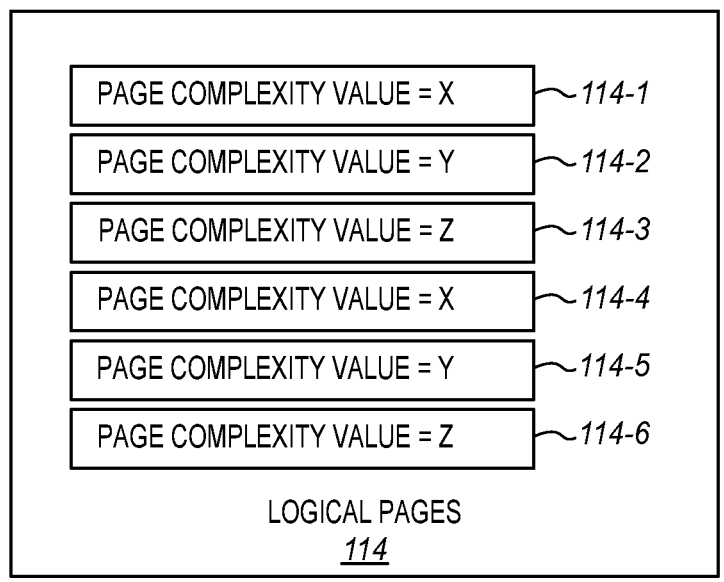
FIG. 9 illustrates a result of determining a page complexity value for the subset of logical pages previously illustrated in FIG. 8 in an illustrative embodiment.

If processor 106 determines that a repeating pattern of page complexity values is present in the subset of logical pages 114, then processor 106 assigns page complexity values to logical pages 114 that remain in print job 110 by extrapolating the repeating pattern of page complexity values to logical pages 114 that remain in print job 110 (see FIG. 2, step 212). FIG. 9 illustrates a result of determining a page complexity value for the subset of logical pages 114 previously illustrated in FIG. 8 in an illustrative embodiment. In this embodiment, processor 106 calculates that the subset of logical pages 114 identified for complexity analysis have page complexity values assigned of X, Y, or Z, where pages having shared values of X, Y, and Z represent the same or similar page complexity values. In the embodiment illustrated in FIG. 9, the pattern comprises a sequence of X, Y, and Z page complexity values that repeat. In particular, logical page 114-1 has the same or similar page complexity value (e.g., X) as logical page 114-4, logical page 114-2 has the same or similar page complexity value (e.g., Y) as logical page 114-5, and logical page 114-3 has the same or similar page complexity value (e.g., Z) as logical page 114-6. The particular pattern and relative page complexity values illustrated in FIG. 8 are merely presented for purposes of discussion, and other patterns and relative page complexity values may exist in the subset of logical pages 114 identified for a complexity analysis.

In the embodiment illustrated in FIG. 9, a repeating pattern of page complexity values is present in the subset of logical pages 114 identified for a complexity analysis. In particular, a repeating pattern of X, Y, and Z page complexity values is present. To perform step 212 of page complexity value assignments via extrapolation, processor 106 extrapolates the repeating pattern of X, Y, and Z page complexity values to logical pages 114 in print job 110 that do not have page complexity values assigned.

Figure 10:
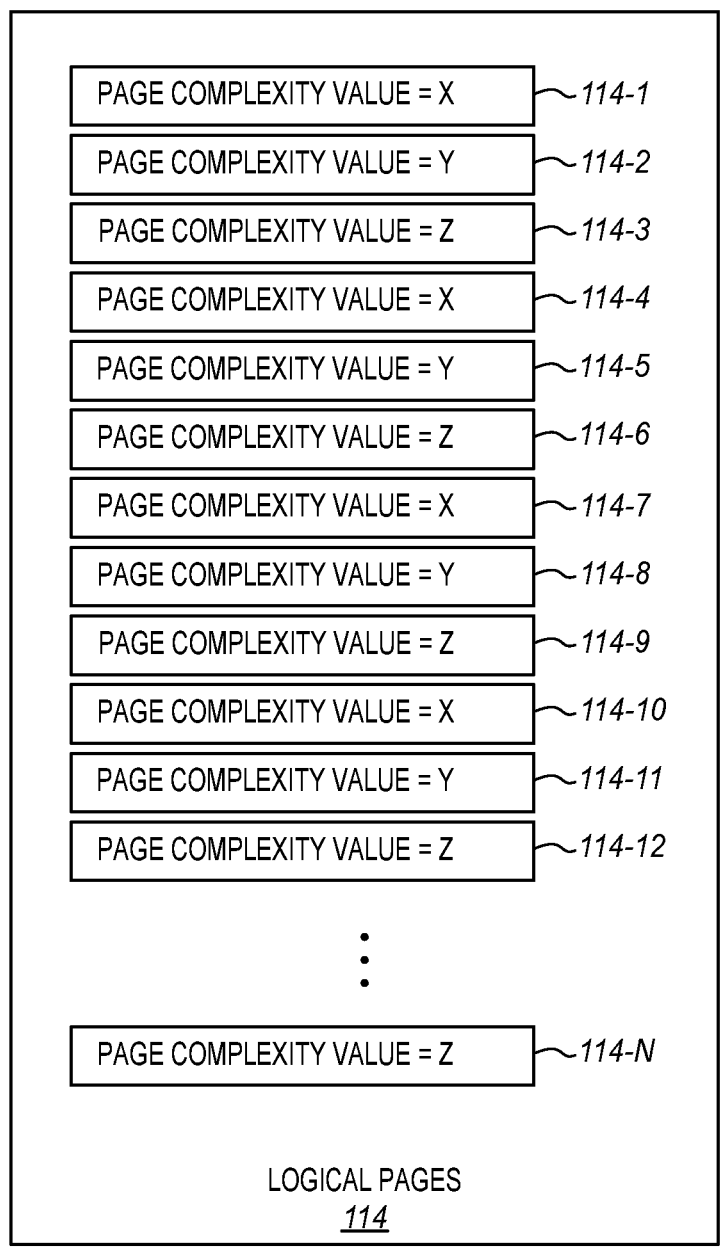
FIG. 10 illustrates the result of the page complexity value assignments based on the extrapolation of the repeating pattern of page complexity values illustrated in FIG. 9 in an illustrative embodiment.

FIG. 10 illustrates the result of the page complexity value assignments based on the extrapolation of the repeating pattern of page complexity values illustrated in FIG. 9 in an illustrative embodiment. To perform step 212 in one embodiment, processor 106 may repeatedly assign the pattern of page complexity values of X, Y, and Z to logical pages 114 in a consecutive manner starting with logical page 114-7 and continuing based on the number of pages that are part of the repeating pattern of page complexity values (e.g., logical page 114-7=X, logical page 114-8=Y, logical page 114-9=Z, logical page 114-10=X. etc.). To perform step 212 in another embodiment, processor 106 may calculate a first offset between logical page 114-1 and logical page 114-4, identify logical pages 114 based on the first offset, and assign the page complexity value of X to logical pages 114 that remain in print job 110. Processor 106 may calculate a second offset between logical page 114-2 and logical page 114-5, identify logical pages 114 based on the second offset, and assign the page complexity value of Y to logical pages 114 that remain in print job 110. Processor 106 may further calculate a third offset between logical page 114-2 and logical page 114-6, identify logical pages 114 based on the third offset, and assign the page complexity value of Z to logical pages 114 that remain in print job 110.

With logical pages 114 assigned page complexity values via extrapolation, processor 106 assigns and/or schedules logical pages 114 in print job 110 to RIPs 104 based on their page complexity values (see FIG. 2, step 214). Processor 106 may assign logical pages 114 to RIPs 104 such that the average of the page complexity values for pages assigned to RIPs 104 are similar, thereby ensuring that the computational complexity for pages assigned to, for example, RIP 104-1 is similar to the computational complexity for pages assigned to, for example, RIP 104-2.

FIGS. 3-7 illustrates additional details for method 200 in an illustrative embodiment. In particular, FIGS. 3-7 illustrate additional details for step 206 of method 200 (see FIG. 2), where page complexity values are determined for the subset of logical pages 114 identified for a complexity analysis based on a number of complexity attribute weighting factors 116 that may differ from each other. The specific complexity analysis illustrated in each of FIGS. 3-7 may be performed individually to implement step 206, or may be performed in various combinations to implement step 206.

Figure 3:
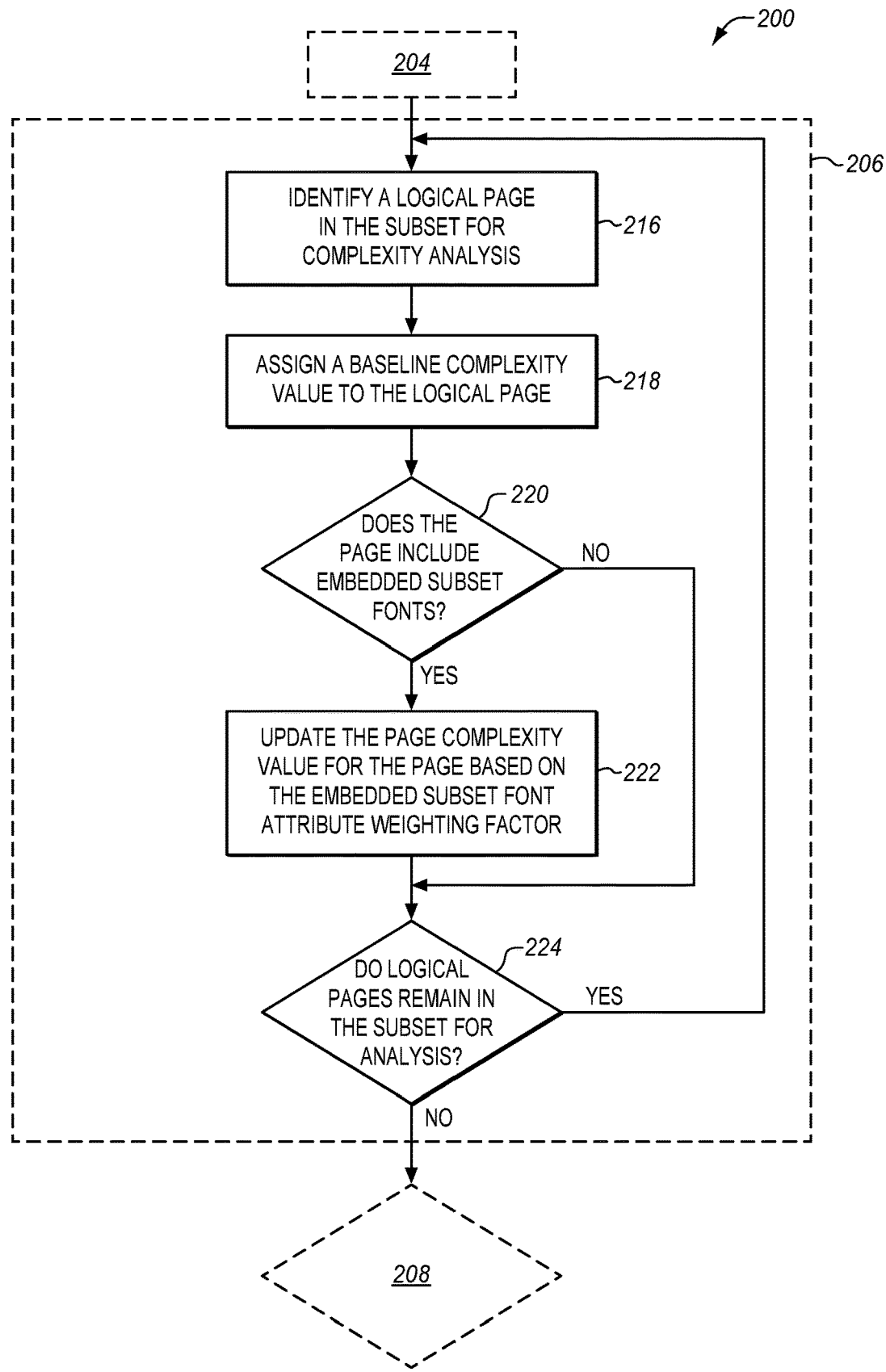
FIGS. 3-7 illustrates additional details of method 200 in illustrative embodiments.

The analysis outlined in FIG. 3 relates to determining a page complexity value for a page based on whether the page includes embedded subset fonts, which is one of a plurality of complexity attributes that a page may be analyzed for. Referring to FIG. 3, processor 106 identifies a logical page in the subset of logical pages 114 for a complexity analysis (see step 216). Processor 106 assigns a baseline complexity value to the page (see FIG. 3, step 218). In one embodiment, processor 106 may assign a value of "1" to the page complexity value for the page. Processor 106 determines if the page has embedded subset fonts (see FIG. 3, step 220). If processor 106 determines that the page does not have embedded subset fonts, then step 224 is performed.

If the page has embedded subset fonts, then processor 106 may update the page complexity value assigned to the page based on the complexity attribute weighting factors 116 associated with fonts (see FIG. 32, step 222). Embedded subset fonts may affect the page complexity because embedded subset fonts may not be reusable on other pages, and therefore, the glyphs for the embedded subset fonts may be repeatedly rendered on each page that includes them. The presence of embedded subset fonts may be represented as having a complexity attribute weighting factor 116 of "0.2" added to the current page complexity value by processor 106. For example, if a page includes embedded subset fonts, then "0.2" may be added to the baseline complexity value assigned to the page (e.g., 0.2+1=1.2) by processor 106.

If processor 106 determines that the page includes more than a threshold number of embedded subset fonts, then processor 106 may add a different complexity attribute weighting factor 116 to the current page complexity value (e.g., the complexity attribute weighting factors 116 for embedded subset fonts may comprise different values depending on the number of embedded subset fonts in the page). For example, if the page includes more than a threshold number of embedded subset fonts, then "0.5" may be added to the current page complexity value assigned to the page (e.g., 0.5+1=1.5) by processor 106, where the current page complexity value for the logical page is the baseline complexity value. In this example, the current page complexity value for the page is now "1.5". The rational for the variation in weighting based on the number of embedded subset fonts in a page is that RIPs 104 have a finite cache memory for storing the glyphs, and a page having more than a threshold number of embedded subset fonts may result in a cache miss, with the result being that the glyph may be re-rendered.

Processor 106 determines if pages remain in the subset of logical pages 114 for analysis (see step 224). If pages remain, then processing returns to step 216 to identify another logical page in the subset of logical pages 114 for analysis. If no pages remain for analysis, then step 208 is performed, as previously described (see FIG. 2).

Figure 4:
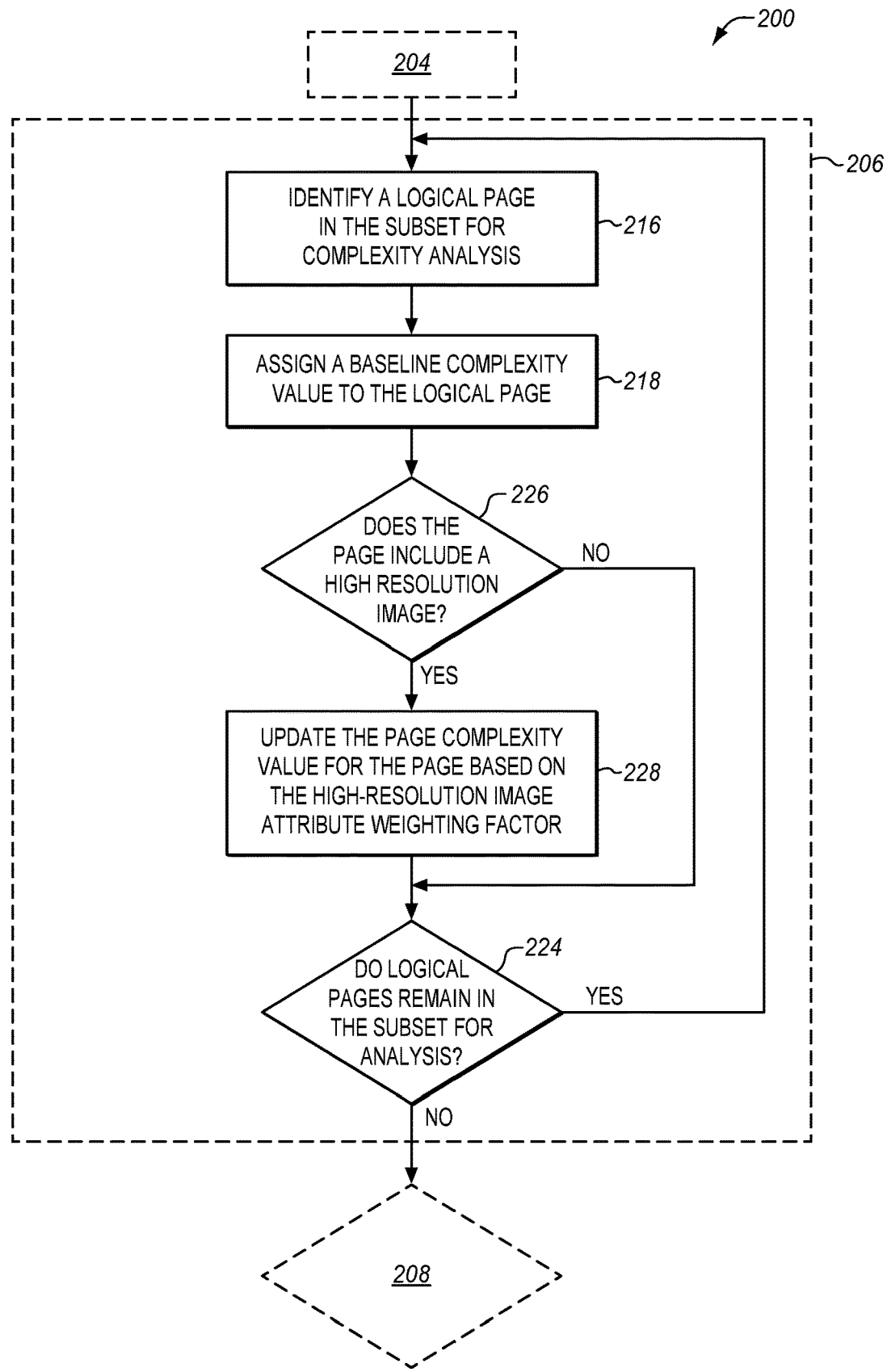

The analysis outlined in FIG. 4 relates to determining a page complexity value for a page based on whether the page includes one or more high-resolution images, which is one of a plurality of complexity attributes that a page may be analyzed for. Referring to FIG. 4, processor 106 identifies a logical page in the subset of logical pages 114 for a complexity analysis (see step 216). Processor 106 assigns a baseline complexity value to the page (see FIG. 4, step 218). For example, processor 106 may assign a value of "1" to the page complexity value for the page. Processor 106 determines if the page has one or more high-resolution images (see FIG. 4, step 226). If the page does not have high-resolution images, then step 224 is performed. If the page has one or more high-resolution images, then processor 106 may update the page complexity value for the page based on the complexity attribute weighting factor 116 associated with images (see FIG. 4, step 228). A high-resolution image having a large coverage area may affect the page complexity because RIPs 104 have a finite memory, and the image may have to be decompressed to the RIP spool (not shown). An image may be considered as high-resolution when the resolution is greater than a threshold resolution (e.g., a source resolution of 600×600 or higher), while a coverage area for the image may be considered large when the area is greater than a threshold area (e.g., 200 $in^2$ or more). In some embodiments, the presence of a high-resolution image having a large coverage area may be represented as having complexity attribute weighting factor 116 of "1.0" added to the current page complexity value by processor 106.

If the page includes a large number of small high-resolution images, then a complexity attribute weighting factor 116 of "1.2" may be added to the current page complexity value by processor 106 (e.g., the complexity attribute weighting factors 116 for images may comprise different values depending on the number, size, and/or resolution of the images in the page) in some embodiments. A high-resolution image may be considered small when processor 106 determines that it has a coverage area that is less than a threshold area (e.g., less than "2" $in^2$). A page may be considered as having a large number of images when processor 106 determines that the number of images is greater than a threshold number (e.g., greater than "250" images). The rational for this variation in weighting is that a large number of small high-resolution images is computationally expensive and possibly time consuming.

Processor 106 determines if pages remain in the subset of logical pages 114 for analysis (see step 224). If pages remain, then processing returns to step 216 to identify another logical page in the subset of logical pages 114 for analysis. If no pages remain for analysis, then step 208 is performed, as previously described (see FIG. 2).

Figure 5:
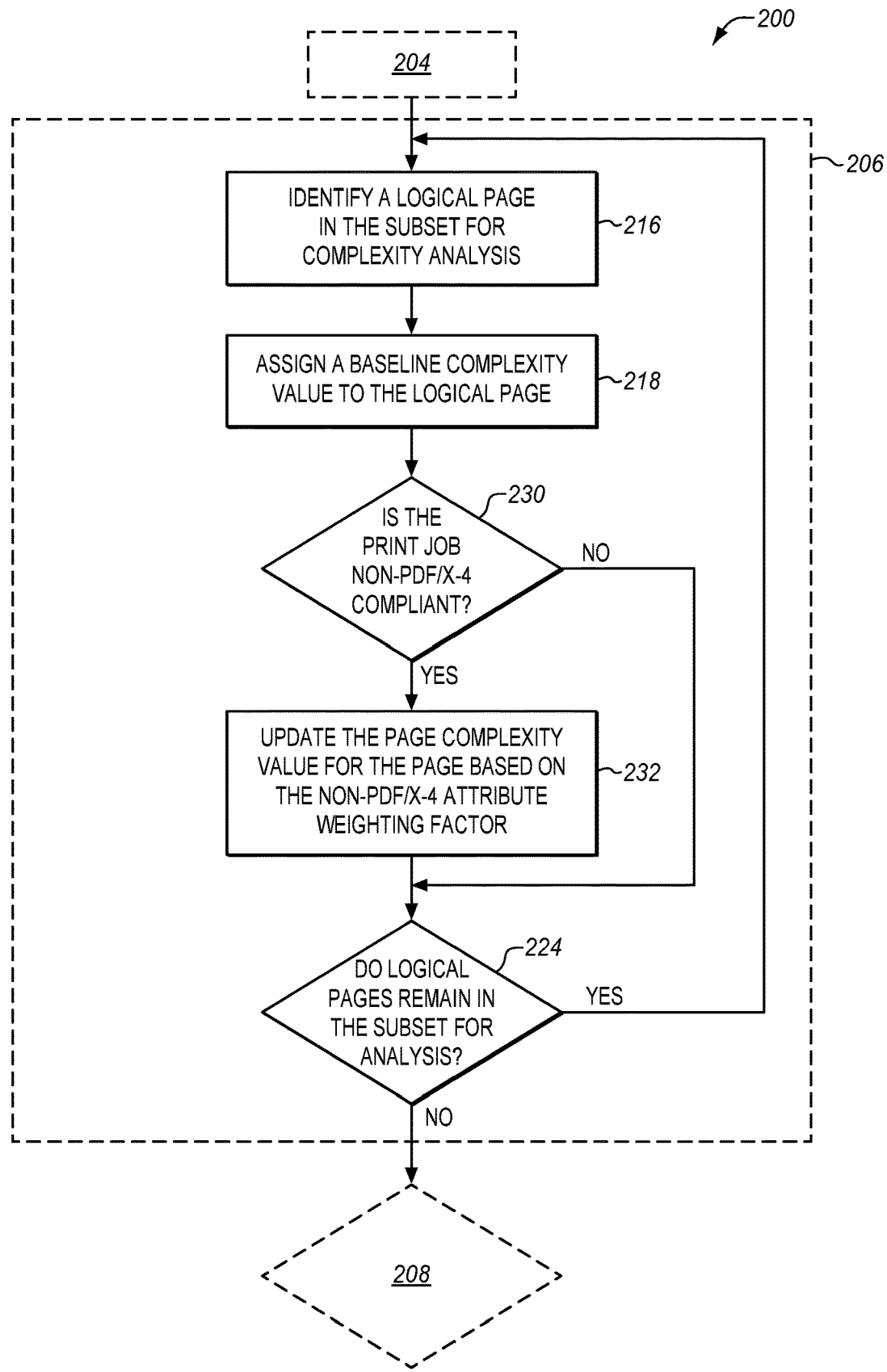

The analysis outlined in FIG. 5 relates to determining a page complexity value for a page based on whether print job 110 is PDF/X-4 compliant. This analysis may be skipped if print job 110 is not a PDF job. Referring to FIG. 5, processor 106 identifies a logical page in the subset of logical pages 114 for a complexity analysis (see step 216). Processor 106 assigns a baseline complexity value to the page (see FIG. 5, step 218). For example, processor 106 may assign a value of "1" to the page complexity value for the page. Processor 106 determines if print job 110 is non-PDF/X-4 compliant (see FIG. 5, step 230). If print job 110 is PDF/X-4 compliant, then step 224 is performed.

If processor 106 determines that print job 110 is non-PDF/X-4 compliant, then processor 106 updates the page complexity value for the page based on the complexity attribute weighting factor 116 associated with non-PDF/X-4 compliance (see FIG. 5, step 232). A non-PDF/X-4 compliant job may result in page object being cached but not reused on the page and/or on other pages. If print job 110 is non-PDF/X-4 compliant, then a complexity attribute weighting factor 116 of "1.5" may be added to the current page complexity value by processor 106.

Processor 106 determines if pages remain in the subset of logical pages 114 for analysis (see step 224). If pages remain, then processing returns to step 216 to identify another logical page in the subset of logical pages 114 for analysis. If no pages remain for analysis, then step 208 is performed, as previously described (see FIG. 2).

Figure 6:
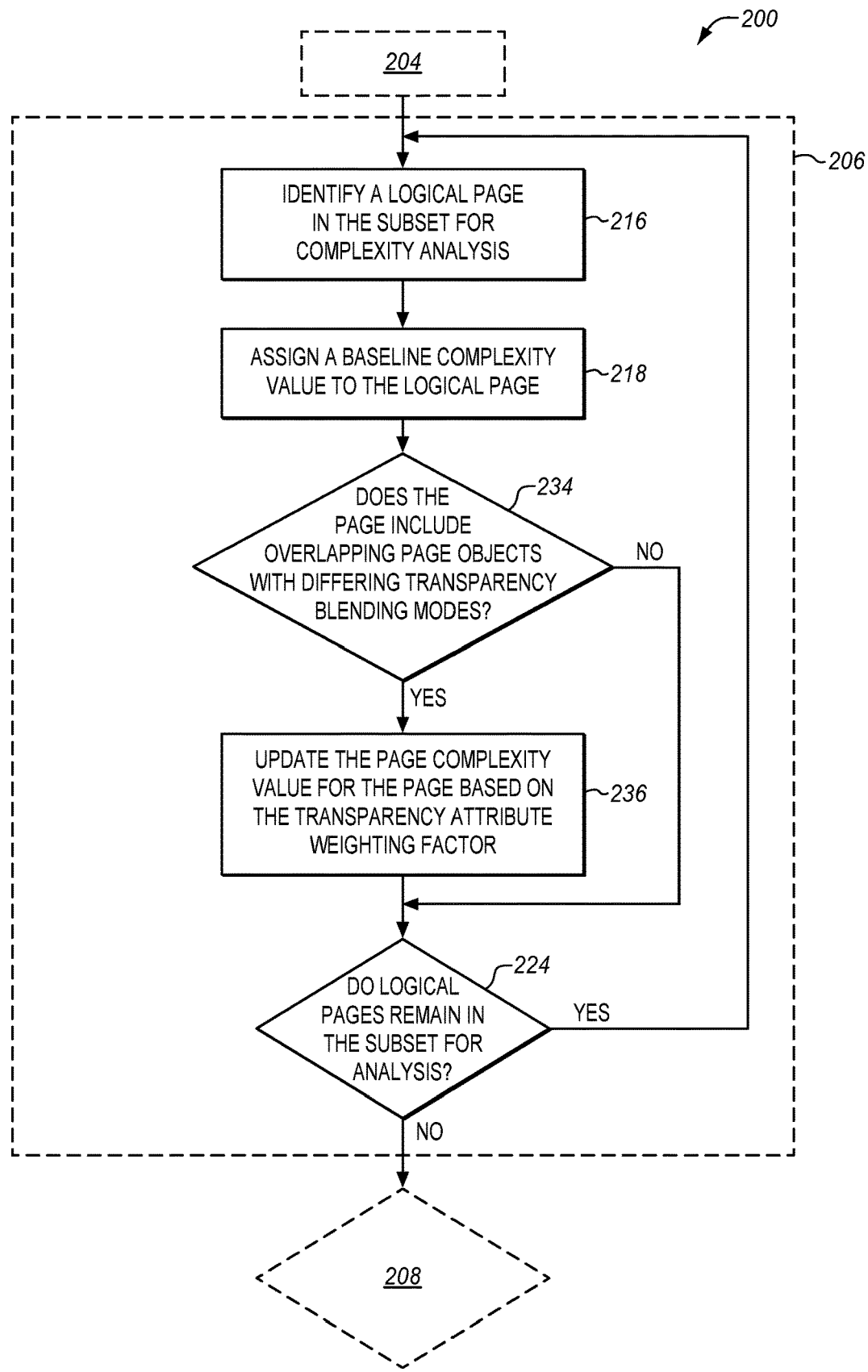

The analysis outlined in FIG. 6 relates to determining a page complexity value for a page based on whether the page includes overlapping page objects with differing transparency blending modes, which is one of a plurality of complexity attributes that a page may be analyzed for. Referring to FIG. 6, processor 106 identifies a logical page in the subset of logical pages 114 for a complexity analysis (see step 216). Processor 106 assigns a baseline complexity value to the page (see FIG. 3, step 218). For example, processor 106 may assign a value of "1" to the page complexity value for the page. Processor 106 determines if the page includes a large number of overlapping page objects with differing transparency blending modes (see FIG. 6, step 234). If processor 106 determines that the page does not include overlapping page objects with differing transparency blending modes, then step 224 is performed.

If the page includes a large number of overlapping page objects with differing transparency blending modes, then processor 106 updates the page complexity value for the page based on the complexity attribute weighting factor 116 associated with transparency (see FIG. 6, step 236). Pages that include overlapping page objects with differing transparency blending modes may entail computationally expensive flattening in RIPs 104 to generate a correct output. Processor 106 may determine that a page has a large number of overlapping page objects with differing transparency blending modes if the page includes more than a threshold number of page objects (e.g., ten or more page objects). In one embodiment, the presence of a large number of overlapping page objects with differing transparency blending modes may be represented as having a complexity attribute weighting factor 116 of "2.0" added to the page complexity value by processor 106.

Processor 106 determines if pages remain in the subset of logical pages 114 for analysis (see step 224). If pages remain, then processing returns to step 216 to identify another logical page in the subset of logical pages 114 for analysis. If no pages remain for analysis, then step 208 is performed, as previously described (see FIG. 2).

Figure 7:
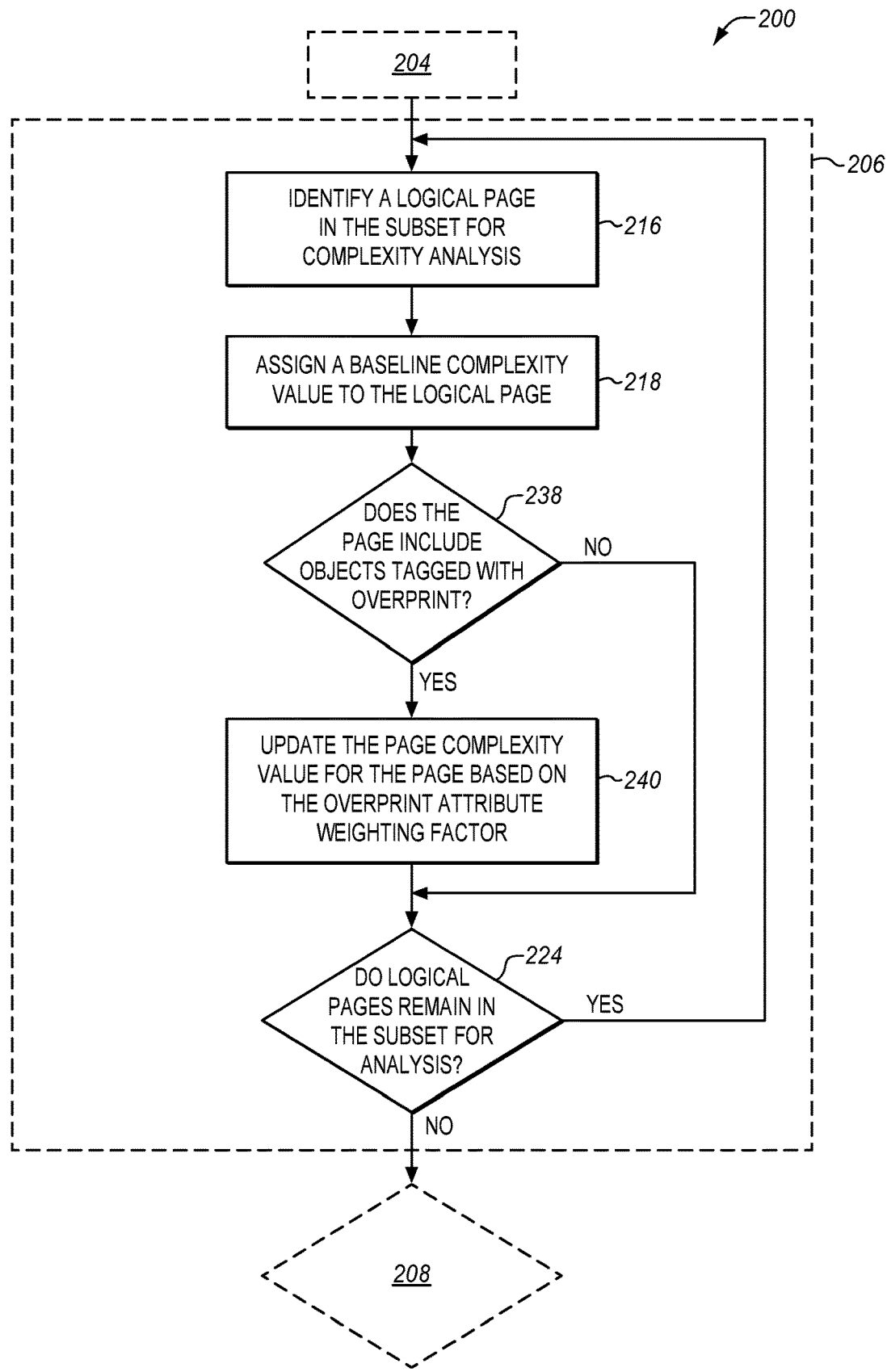

The analysis outlined in FIG. 7 relates to determining a page complexity value for a page based on whether the page includes a large number of page objects tagged for overprint, which is one of a plurality of complexity attributes that a page may be analyzed for. Overprint (e.g., Cyan, Magenta, Yellow, and Key black (CMYK) overprint) is the ability of an upper-layered object to allow a lower-layered object's colorant 122 channel values to appear in raster data 112. Some constraints may be (1) the upper layered object is tagged with overprint enabled, (2) the upper-layered objects are described in a device colorspace (e.g., Device CMYK) or ICC-based device input colorspace (e.g., an ICC-based CMYK input color space), (3), the upper-layered object is a constant colored object type (e.g., text, line art, etc.), and (4) the upper-layered object has a zero colorant 122 value in one or more of the colorant 122 channels (e.g., 0.0 for the Cyan color channel). If these constraints are met, then the lower-layered object's colorant 122 value in the upper-layered object's zero-valued colorant 122 channels may appear in raster data 112. Further, the implementation of overprint may be PDL dependent. For example, PDF enables or disables overprint at the page level, while POSTSCRIPT® does not.

Referring to FIG. 7, processor 106 identifies a logical page in the subset of logical pages 114 for a complexity analysis (see step 216). Processor 106 assigns a baseline complexity value to the page (see FIG. 3, step 218). For example, processor 106 may assign a value of "1" to the page complexity value for the page. Processor 106 determines if the page includes a large number of page objects tagged with overprint (see FIG. 7, step 238). If the page does not include a large number of page objects tagged with overprint, then step 224 is performed.

If processor 106 determines that the page includes a large number of page objects tagged with overprint, then processor 106 updates the page complexity value for the page based on the complexity attribute weighting factor 116 associated with overprint (see FIG. 7, step 240). Pages that include a large number of objects tagged with overprint may entail a computationally expensive flattening in a RIP 104 to generate a correct output. A page may be considered as having a large number of objects tagged with overprint if processor 106 determines that the page includes more than a threshold number of objects (e.g., "100" or more page objects tagged with overprint). In some embodiments, the presence of a large number of page objects tagged with overprint may be represented as having a complexity attribute weighting factor 116 of "2.5" added to the page complexity value.

Processor 106 determines if pages remain in the subset of logical pages 114 for analysis (see step 224). If pages remain, then processing returns to step 216 to identify another logical page in the subset of logical pages 114 for analysis. If no pages remain for analysis, then step 208 is performed, as previously described (see FIG. 2).

Although the various complexity analysis attributes illustrated in FIGS. 3-7 have been described separately, various combinations exist for analyzing logical pages 114. When the attributes are combined in analyzing a page, some modifications to the steps outlined in FIGS. 3-7 may occur. For instance, step 216 may be modified by placement or process in method 200 to ensure that the baseline complexity value is not overrepresented in the weighted output of the page complexity values.

Performing a complexity analysis on a subset of logical pages 114 in print job 110, and extrapolating the results to other pages in print job 110 enables scheduling to RIP 104 to be performed more efficiently without the potentially time-consuming activity of analyzing each page in print job 110 prior to printing, which may not be feasible or desirable.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as programmed instructions executable by a processor or a computer to perform the functions of the element. Some examples of programmed instructions are software, program code, and firmware. The programmed instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 11:
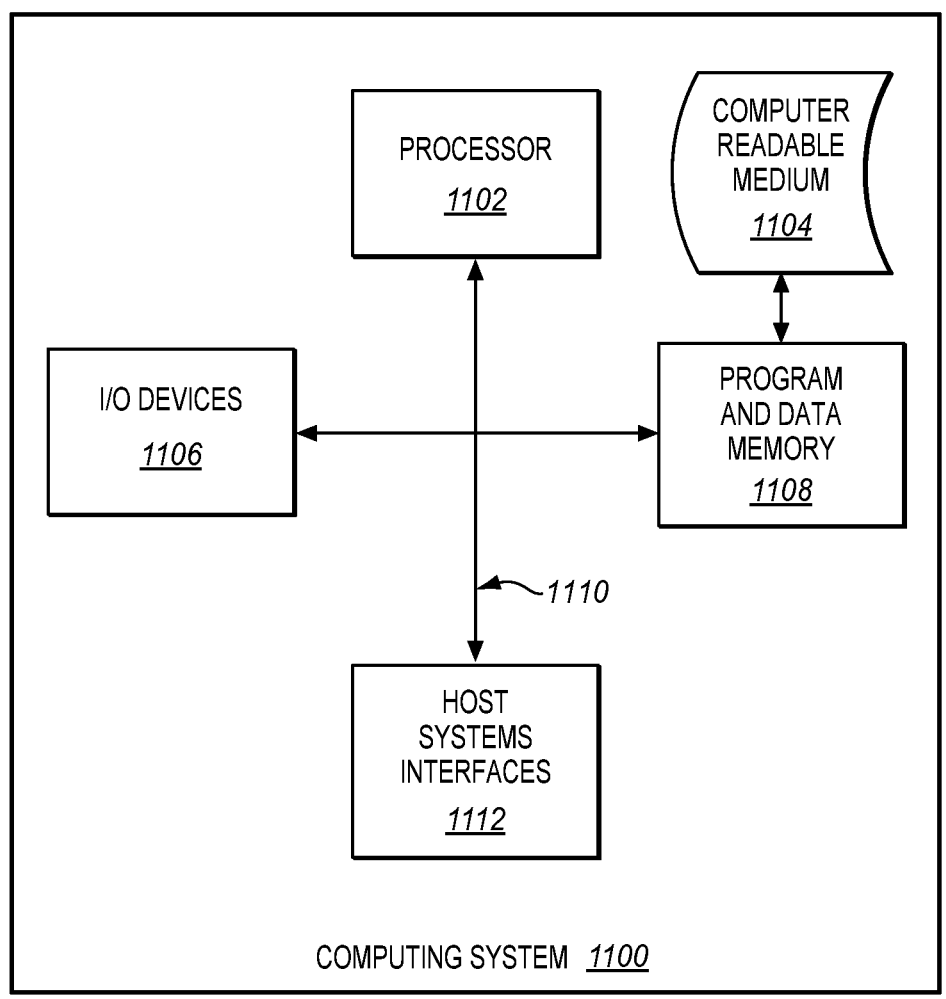
FIG. 11 illustrates a computing system in which a computer readable medium may provide instructions for performing any of the functionality disclosed herein.

In one embodiment, the invention is implemented in software, which includes but is not limited to firmware, resident software, microcode, etc. FIG. 11 illustrates a computing system 1100 in which a computer readable medium 1104 may provide instructions for performing any of the functionality disclosed herein.

Furthermore, the invention can take the form of a computer program product accessible from computer readable medium 1104 that provides program code for use by or in connection with a processor or any instruction execution system. For the purposes of this description, computer readable medium 1104 can be any apparatus that can tangibly store the program for use by or in connection with the instruction execution system, apparatus, or device, including computing system 1100.

Computer readable medium 1104 can be any tangible electronic, magnetic, optical, electromagnetic, infrared, or semiconductor system (or apparatus or device). Examples of computer readable medium 1104 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 1100, suitable for storing and/or executing program code, can include one or more processors 1102 coupled directly or indirectly to memory 1108 through a system bus 1110. Memory 1108 may include local memory employed during actual execution of the program code, bulk storage, and cache memories which provide temporary storage of at least some program code in order to reduce the number of times code is retrieved from bulk storage during execution. Input/output (IO) devices 1106 (including but not limited to keyboards, displays, pointing devices, etc.) can be coupled to the system either directly or through intervening IO controllers. Network adapters may also be coupled to the system to enable computing system 1100 to become coupled to other data processing systems, such as through host systems interfaces 1112, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

What is claimed is:

1. A system, comprising:
a print controller, comprising:
a plurality of Raster Image Processors (RIPs); and
a scheduler configured to receive a print job, to identify a subset of logical pages in the print job for complexity analysis, and to calculate a page complexity value for logical pages in the subset of logical pages,
wherein the scheduler, to calculate the page complexity value for the logical pages in the subset of logical pages, is configured to assign a baseline complexity value to a logical page in the subset of logical pages, to determine that the logical page includes a complexity attribute, and to modify the baseline complexity value for the logical page based on a weighting factor for the complexity attribute,
wherein the scheduler is configured to determine that a repeating pattern of page complexity values is present in the subset of logical pages, and to assign page complexity values to remaining logical pages in the print job by extrapolating the repeating pattern of page complexity values to the remaining logical pages,
wherein the scheduler is configured to assign the logical pages in the print job to the plurality of RIPs based on their page complexity value.

2. The system of claim 1, wherein:
the complexity attribute comprises at least one of:
embedded subset fonts;
images;
overlapping page objects with differing transparency blending modes; and
page objects tagged with overprint.

3. The system of claim 2, wherein:
the weighting factor for the complexity attribute comprises different values based on at least one of:
a number of the embedded subset fonts;
a number of the images;
a resolution of the images;
a coverage area of the images;
a number of overlapping page objects with differing transparency blending modes; and
a number of the page objects tagged with overprint.

4. The system of claim 1, wherein:
the scheduler, to calculate the page complexity value for the logical pages in the subset of logical pages, is configured to:
determine whether print job is Portable Document Format (PDF)/X-4 compliant; and
modify the baseline complexity value for the logical page based on a weighting factor in response to determining that the print job is not PDF/X-4 compliant.

5. The system of claim 1, wherein:
the print job comprises a Variable Data Print (VDP) job, and
the subset of logical pages comprises a record in the VDP job.

6. The system of claim 1, wherein:
the plurality of RIPs is configured to rasterize the logical pages in the print job to generate raster data,
the print controller is configured to transmit the raster data to a destination, and
the system further comprises:
at least one print engine configured to receive the raster data, and to mark at least one colorant onto a medium based on the raster data to generate a printed output of the print job.

7. A method, comprising:
receiving a print job;
identifying a subset of logical pages in the print job for complexity analysis;
calculating a page complexity value for logical pages in the subset of logical pages by assigning a baseline complexity value to a logical page of the subset of logical pages, determining that the logical page includes a complexity attribute, and modifying the baseline complexity value for the logical page based on a weighting factor for the complexity attribute;
determining that a repeating pattern of page complexity values is present in the subset of logical pages;
assigning page complexity values to remaining logical pages in the print job by extrapolating the repeating pattern of page complexity values to the remaining logical pages; and
assigning the logical pages in the print job to a plurality of Raster Image Processors (RIPs) based on their page complexity value.

8. The method of claim 7, wherein the complexity attribute comprises at least one of:
embedded subset fonts;
images;
overlapping page objects with differing transparency blending modes; and
page objects tagged with overprint.

9. The method of claim 8, wherein the weighting factor for the complexity attribute comprises different values based on at least one of:
a number of the embedded subset fonts;
a number of the images;
a resolution of the images;
a coverage area of the images;
a number of overlapping page objects with differing transparency blending modes; and
a number of the page objects tagged with overprint.

10. The method of claim 7, wherein calculating the page complexity value for the logical pages in the subset of logical pages further comprises:
  determining whether print job is Portable Document Format (PDF)/X-4 compliant; and
  modifying the baseline complexity value for the logical page based on a weighting factor in response to determining that the print job is not PDF/X-4 compliant.

11. The method of claim 7, wherein:
  the print job comprises a Variable Data Print (VDP) job, and
  the subset of logical pages comprises a record in the VDP job.

12. The method of claim 7, further comprising:
  rasterizing, by the RIPs, the logical pages in the print job to generate raster data;
  transmitting the raster data to a destination;
  receiving, by at least one print engine, the raster data; and
  marking at least one colorant onto a medium based on the raster data to generate a printed output of the print job.

13. A non-transitory computer readable medium comprising programmed instructions which, when executed by one or more processors, directs the one or more processors to:
  receive a print job;
  identify a subset of logical pages in the print job for complexity analysis;
  calculate a page complexity value for logical pages in the subset of logical pages,
  wherein the programmed instructions to calculate the page complexity value further directs the one or more processors to assign a baseline complexity value to a logical page in the subset of logical pages, determine that the logical page includes a complexity attribute, and modify the baseline complexity value for the logical page based on a weighting factor for the complexity attribute;
  determine that a repeating pattern of page complexity values is present in the subset of logical pages;
  assign page complexity values to remaining logical pages in the print job by extrapolating the repeating pattern of page complexity values present in the subset of logical pages to the remaining logical pages in the print job; and
  assign the logical pages in the print job to a plurality of Raster Image Processors (RIPs) based on their page complexity value.

14. The non-transitory computer readable medium of claim 13, wherein the complexity attribute comprises at least one of:
  embedded subset fonts;
  images;
  overlapping page objects with differing transparency blending modes; and
  page objects tagged with overprint.

15. The non-transitory computer readable medium of claim 14, wherein the weighting factor for the complexity attribute comprises different values based on at least one of:
  a number of the embedded subset fonts;
  a number of the images;
  a resolution of the images;
  a coverage area of the images;
  a number of overlapping page objects with differing transparency blending modes; and
  a number of the page objects tagged with overprint.

16. The non-transitory computer readable medium of claim 13, wherein the programmed instructions to calculate the page complexity value for the logical pages in the subset of logical pages further comprise programmed instructions that direct the one or more processors to:
  determine whether print job is Portable Document Format (PDF)/X-4 compliant; and
  modify the baseline complexity value for the logical page based on a weighting factor in response to determining that the print job is not PDF/X-4 compliant.

17. The non-transitory computer readable medium of claim 13, wherein:
  the print job comprises a Variable Data Print (VDP) job, and
  the subset of logical pages comprises a record in the VDP job.

18. The non-transitory computer readable medium of claim 13, wherein the programmed instructions further direct the one or more processors to:
  rasterize, by the RIPS, the logical pages in the print job to generate raster data;
  transmit the raster data to a destination;
  receive, by at least one print engine, the raster data; and
  mark at least one colorant onto a medium based on the raster data to generate a printed output of the print job.

* * * * *